United States Patent [19]

Reime

[11] Patent Number: 5,381,239
[45] Date of Patent: Jan. 10, 1995

[54] COMB FILTER CIRCUIT IN THE CHROMINANCE SIGNAL CHANNEL ON THE PLAYBACK SIDE OF A VIDEORECORDER

[75] Inventor: Gerd Reime, Schomberg, Germany

[73] Assignee: Nokia (Deutschland) GmbH, Pforzheim, Germany

[21] Appl. No.: 213,382

[22] Filed: Mar. 15, 1994

Related U.S. Application Data

[62] Division of Ser. No. 878,822, May 5, 1992, abandoned.

[30] Foreign Application Priority Data

May 10, 1991 [DE] Germany .................. 4115213

[51] Int. Cl.⁶ ........................................ H04N 9/79
[52] U.S. Cl. ............................ 358/329; 358/328
[58] Field of Search ............ 358/329, 328, 327, 340, 358/336, 325, 326; 348/663, 665, 666, 667, 683, 713, 450, 453, 470, 498, 492, 553, 606, 607, 609, 627, 618, 614, 645, 643, 644

[56] References Cited

U.S. PATENT DOCUMENTS

| | | | |
|---|---|---|---|
| 4,389,665 | 6/1983 | Nagao et al. | 358/23 |
| 4,695,877 | 9/1987 | Matsumoto | 358/36 |
| 4,796,096 | 1/1989 | Sukura et al. | 358/310 |
| 4,812,926 | 3/1989 | Jeon | 360/70 |
| 4,951,128 | 8/1990 | Miyake | 358/31 |

FOREIGN PATENT DOCUMENTS

| | | | |
|---|---|---|---|
| 0293188 | 11/1988 | European Pat. Off. | |
| 2830168 | 1/1980 | Germany | H04N 9/87 |
| 2911927 | 6/1980 | Germany | H04N 5/795 |
| 206521 | 1/1984 | Germany | H04N 5/91 |
| 3939520 | 6/1991 | Germany | H04N 9/87 |

OTHER PUBLICATIONS

Derwent Publications Ltd./AN 83-815849.
"Der Chromabaustein der neuen VHS-Recorder" by G. Reime, Grundig Technische Informationen, Nr. 3, Marz 1984, pp. 144-150.
Adaptive Luminance-Chrominance Seperation with Different Sampling Phases Coupled to Color Carriers, R. Schweer, M. Plantholt Fernseh-Und Kino-Technik-44. Jahrgang-Nr. 12/1990.

*Primary Examiner*—Tommy P. Chin
*Assistant Examiner*—Robert Chevalier
*Attorney, Agent, or Firm*—Ware, Fressola, Van Der Sluys & Adolphson

[57] ABSTRACT

The comb filter (13.1) in the chrominance signal transmission channel (6) on the playback side of a videorecorder contains—in parallel with its retarder circuit (14)—an adder circuit (15) and a subtracter circuit (25) that have their signal outputs connected to a comparator circuit (30). Comparing the enveloping curves of the output signals (Sc and Sd) of the adder and subtracter circuits, the comparator then produces a switching signal (Sf) to reverse an electronic switcher (31) whenever the level of the enveloping curve of the subtraction signal is greater than the level of the enveloping curve of the addition signal. To this end, the level conditions of the two signals are set in such a manner that the level of the enveloping curve of the subtraction signal associated with a transition from a white background to a chrominance signal of a given intensity is greater than the level of the enveloping curve of the addition signal associated with the same color transition. Consequently, line-parallel color transitions that become color-disturbed due to the action of the comb filter are readily recognized and can be replaced by switching to an undisturbed chrominance signal (Sa).

10 Claims, 4 Drawing Sheets

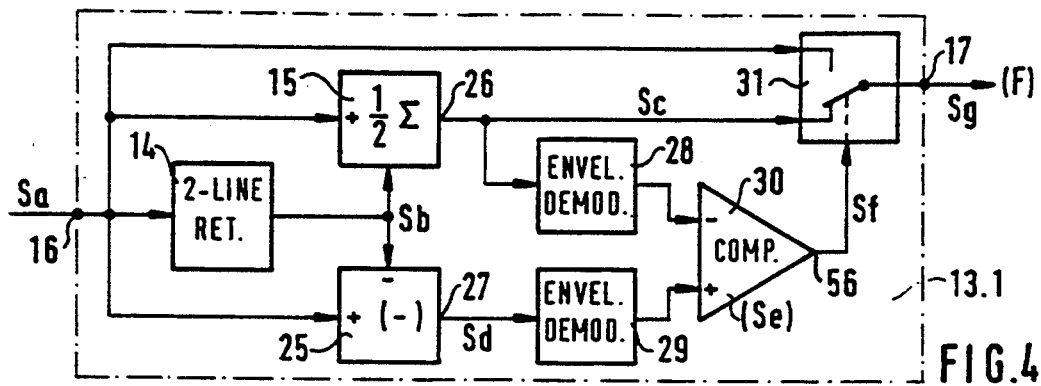

COMB FILTER CIRCUIT IN THE CHROMINANCE SIGNAL CHANNEL ON THE PLAYBACK SIDE OF A VIDEORECORDER

This is a divisional of copending application Ser. No. 07/878,822, filed on May 5, 1992, now abandoned.

TECHNICAL FIELD

The present invention concerns a comb filter circuit arranged in the chrominance signal transmission channel of a videorecorder.

BACKGROUND OF THE INVENTION

In videorecorders of this type the colored video signal is normally divided into a brightness signal (Y signal) and a chrominance signal. Before it is recorded on a video tape, the brightness signal is limited to a given frequency band, transformed in a frequency modulation process and modulated on a carrier. For the purposes of being recorded on the video tape, the chrominance signal is transposed into a frequency range that lies below the range of the frequency-modulated brightness signal. Each of the video fields to be transmitted is recorded on an oblique track of the video tape. The oblique tracks are densely packed without any interstices between them and the lines of the video fields of adjacent oblique tracks are so arranged on the oblique track that the lines of adjacent oblique tracks are completely parallel to each other. With a view to avoiding crosstalk between adjacent magnetic tracks, the two magnetic heads that are provided for both recording and reproduction purposes have their head slit set at a different inclination with respect to the oblique track, which ensures that the video head will be effective only for the oblique track that is to be scanned and makes it relatively ineffective for the oblique tracks adjacent to the track that is to be scanned. However, this ineffectiveness is lost in the range of frequencies with which the chrominance signal is recorded on the video tape.

With a view to counteracting this crosstalk set up during the scanning of the chrominance signals from the video tape, it is customary to arrange a comb filter in the chrominance signal channel on the playback side, the comb filter—in the simplest case—consisting of a two-line retarder circuit and a signal adder circuit. In combination with a repeating sequence of the phase position of successive lines of the recorded video fields, the crosstalk signals of the added useful signals are substantially eliminated in this comb filter.

For illustration purposes, FIG. 1 shows the block diagram of the principal components of the transmission circuit for a color video picture on the playback side of known commercial videorecorders. A video head 3, which is selected line-by-line by an appropriate head switcher 2, scans the recording of an oblique track of the video tape and transmits it via a head amplifier 4 to a brightness signal channel 5 and a chrominance signal channel 6 of the transmission circuit 7 on the playback side of a videorecorder. The circuit arrangements for processing the brightness signal are combined into a single block 8 in this figure. This block supplies the BAS part of the color picture signal. For the purpose of separating the chrominance signals, the chrominance signal channel 6 is provided with a low-pass filter 9, which is followed on the downstream side by a mixer circuit 10 with the connected carrier generator 11 for reconverting the chrominance signal into the standard frequency position and by a band-pass filter 12 for transmitting this standard chrominance frequency to a comb filter circuit 13 in the chrominance signal channel 6. The comb filter 13 usually contains a retarder circuit 14 that causes a delay of two lines and an adder circuit 15 for the phase-dependent addition of the retarded and the unretarded chrominance signal. Even though the signal may arrive at the input 16 of the comb filter 13 with a crosstalk disturbance, at the signal output 17 of the filter it will be substantially free of crosstalk disturbances.

However, a comb filter of this type will work perfectly only for as long as the tonality (chrominance) of the two chrominance signals brought together by the adder circuit is roughly the same. Given a vertical transition of two color areas of complementary tonalities or of a color area in a white surface at a horizontal transition edge, the two-line retardation of the comb filter will cause a disturbing off-color strip to appear at the horizontal transition edge between the two color areas. Disturbances of this kind will now be discussed by reference to FIGS. 2 and 3. FIG. 2, albeit schematically, represents a color video picture 18 on the playback side, showing the two picture excerpts 19 and 20, both of which comprise horizontal color edges. The reference numbers Z6 to Z10, as also Z4 to Z18 in FIG. 3, are arbitrary designations of adjacent video lines of a video field. The picture excerpt 19 comprises the adjacent lines Z6 to Z10 of a horizontal color strip 21 on a white background 22. A schematic representation of this color strip 21 is shown in picture excerpt 19a, the said excerpt 19a corresponding to the picture excerpt 19 of FIG. 2. The lines Z4 to Z5 and Z11 to Z18 in picture excerpt 19a represent the white background 22 on which the color strip 21 is situated. As a consequence of the mode of action of the comb filter, the reproduction of the recorded color strip becomes distorted in such a manner as to reduce the extension of the color strip 21 in the vertical direction, while the horizontal edges of the color strip become lined with edge strips that extend over two lines and have the tonality of a mixture made up of equal parts of the tonality of the color strip 21 and the tonality of the white background. This is schematically illustrated by picture excerpt 19b of FIG. 3. When a copy is made of the recording on this video tape, the playback of the copied recording will be distorted even further by the comb filter, as is schematically illustrated by picture excerpt 19c. When this second recording is played back, the extension of the color strip in the vertical direction is even more markedly reduced. Furthermore, the horizontal color strip 21 is now flanked on both sides by two two-line off-colored edge strips, the tonalities being such that the intensity of the chrominance of the color strip 21 diminishes from the inside to the outer edges. The playing back of a copy of this recording—at least in the example here considered—will not even achieve the original chrominance intensity of the color strip 21, the tonality intensity diminishing in almost sinusoidal fashion until it eventually merges with the white background, all as shown schematically in picture excerpt 19d of FIG. 3.

Furthermore, each recording causes the centre of the color strip 21 to become displaced downwards by one video line of the field, as can readily be seen from the successive picture excerpts 19a to 19d of FIG. 3. This means that, even after a small number of repetitions of the copying process, small color areas having a tonality that stands out sharply against the surroundings will become so markedly distorted and flattened in color as to constitute a disturbance that the viewer cannot be expected to accept. For this reason it is already barely possible to make a recording of a copied recording of a video tape.

With a view to eliminating the color distortions caused by the comb filter at horizontal color edges, the East German patent specification DDR 206 521 proposes to use a phase comparator circuit arranged in parallel with the two-line retarder circuit to detect horizontal color edges and, whenever such an edge is detected, to separate the second input of the adder circuit from the output of the retarder circuit. This eliminates the distorting effect of the comb filter. According to the aforesaid document, however, this method has the drawback that the phase comparison is not sufficient, because—even in the case of completely identical signals—the phase difference of the signals to be compared at any given and constant retardation time will be frequency-dependent. According to the investigations reported in the said patent specification, the phase difference between the input and the output of the retarder circuit depends on the ratio between the transit (or propagation) time of the retarder circuit and the oscillation period of the signal frequencies of the chrominance signal and cannot be used as a criterion for switching off the retarded channel of the comb filter, not even when there is no difference in the frequency of the input signals made available in temporal sequence. In the aforesaid patent specification it is therefore proposed to equip the comb filter with an adder circuit and an additional subtracter circuit and to apply the output signals of the adder and subtracter circuit to a further adder circuit in such a manner that the comb filter—given chrominance signals added in equiphase or subtracted in antiphase—will transmit the chrominance signal with full comb filter effect via the second adder circuit and that during the course of this transmission only the transmission path associated therewith should actually be available to the second adder circuit. This switching operation can be performed either by means of a threshold switch included in the transmission path or by means of a servoswitch controlled by the signal having the greater amplitude at the output of the subtracter or adder circuit.

The known comb filter circuit just described is therefore designed in such a way that the comb filter effect is obtained over a wide phase range, this range being at least twice as great as that of a simple comb filter. This does indeed eliminate the crosstalk disturbance between adjacent video lines of a video field even in the event of largish phase differences. But the color disturbances at the horizontal edges of a tonality or color intensity transition in the vertical direction due to the mode of action of a comb filter become far more disturbing. These line-parallel color disturbances, which are schematically illustrated in FIG. 3, are not in any way diminished when a known comb filter of the type last described is employed. Rather, the use of this comb filter leads to an enhanced appearance of these line-parallel off-color edge strips, so that in this case the viewer of the color video picture will be obliged to view a considerably disturbed picture. This is all the more unsatisfactory in view of the fact that it is nowadays possible for the color video pictures recorded on a video tape to be played back with a far better reproduction quality of the brightness signal than was previously possible.

DISCLOSURE OF INVENTION

The invention is therefore underlain by the task of designing a comb filter of the above-described type in such a manner as to make it possible for color pictures to be played back with a color reproduction that—especially at the line-parallel edges of a tonality or color intensity jump—is to all intents and purposes free of disturbances for the viewer. According to the present invention, a comb filter in the chrominance signal transmission channel on the playback side of a videorecorder comprises, in parallel with a retarder circuit, an adder circuit and a subtracter circuit that have their signal outputs connected to a comparator circuit that compares the enveloping curves of the addition signal and the subtraction signal and produces a switching signal whenever the enveloping curve of the subtraction signal is greater than the enveloping curve of the addition signal, and wherein the level conditions are set in such a manner that the level of the enveloping curve of the subtraction signal associated with the transition from a white background to a chrominance signal of a given intensity is greater than the level of the enveloping curve of the addition signal associated with the same color transition, and line-parallel color transitions that become color-disturbed due to the action of the comb filter are readily recognized and replaced by switching to an undisturbed chrominance signal.

The invention is underlain by the insight that the levels of the useful signals scanned from a video tape are always greater than the levels of the crosstalk signals scanned at the same time. The comb filter circuit in accordance with the present invention is designated in such a manner that the difference signal produced from the retarded and the unretarded chrominance signal is greater than the level of the addition signal simultaneously produced from these chrominance signals in the periods of time when the color video picture is having line-parallel tonality (tint or hue) and/or color intensity transitions. This is so even when the chrominance signal is itself of a low level. In those periods of time when the known comb filter is disturbing the horizontal edges of a tonality and/or color intensity, in order to reduce this color disturbance, the comb filter circuit in accordance with the present invention will then transmit the unretarded signal Sa received at the input 16 of the comb filter circuit to the signal output 17. Given slight tonality and/or color intensity changes at line-parallel transitions that will no longer be noted by the viewer, the additional tonality and color intensity changes caused by the effect of the comb filter will no longer be perceived as disturbances by the viewer, so that these additional tonality and/or color intensity changes do not disturb the overall impression conveyed by the reproduced color video picture. At this time the difference signal produced from the retarded and the unretarded chrominance signal is not greater than the level of the addition signal simultaneously produced from these chrominance signals. The comb filter circuit in accordance with the present invention will then transmit the output signal Sc of the adder circuit 15 to the signal output 17. The comb filter circuit in accordance with the present invention is designed in such a way that the amplitude of the enveloping curve of the difference signal at a vertical color intensity transition from "white" (color intensity 0) to a given high intensity of some tonality of the chromatic circle used to represent the chrominances—this amplitude being decisive for the purposes of the comparison—is greater than the amplitude of the enveloping curve of the addition signal formed at the same time.

Given the effects of the comb filter in accordance with the invention, the chrominance signal transmitted for the reproduction of a color video picture will have a composition that substantially corresponds to the desired signal recorded on the video tape and scanned therefrom. The noticeable crosstalk disturbances that occur along line-parallel chrominance edges at this signal composition will hardly be perceived as disturbing by the viewer, because—for the purposes of his perception—they will tend to be covered by the edge jump itself.

The invention also becomes particularly advantageous by virtue of the fact that, even when copied tapes are recopied, there will be no migration of line-parallel tonality and/or color intensity edges that can be perceived by the viewer, nor will there be any substantial color flattening of these edges. This advantageous disturbance-eliminating effect of the comb filter according to the present invention is obtained not only in the case of video pictures with a high amplitude of the chrominance signal transmitted for the purposes of picture playback, but also when the video pictures to be played back have relatively pale colors, that is to say, when the chrominance signals are of a relatively low level.

Further advantageous embodiments of the invention are specified in the dependent claims and will be discussed in greater detail in the remaining parts of the description hereinbelow.

The invention will now be discussed in greater detail by reference to advantageous embodiments shown in the drawing.

BRIEF DESCRIPTION OF THE DRAWING

FIG. 4 shows the block diagram of a comb filter with a comparator circuit for the comparison of addition and difference signals, according to the present invention;

FIG. 5 shows the diagrams 5a to 5g of the signals Sa to Sg indicated in FIG. 4;

BEST MODE FOR CARRYING OUT THE INVENTION

Figure 1:
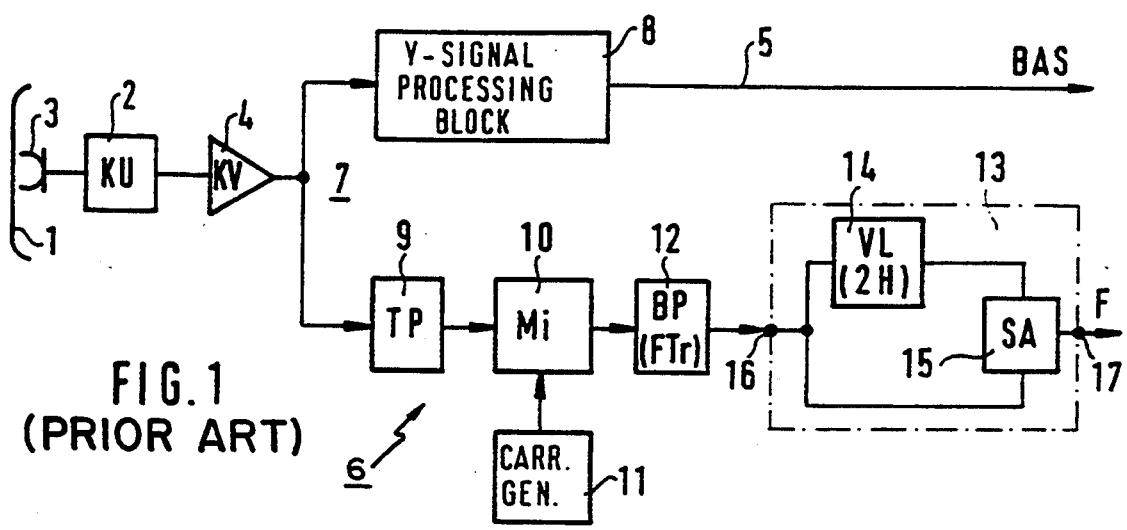
FIG. 1 shows a block diagram of the principal components of the transmission circuits for a color video picture on the playback side of a known commercial videorecorder.

FIG. 4 shows the block diagram of a comb filter 13.1 that, in analogy with the comb filter 13 shown in FIG. 1, is arranged in the chrominance signal transmission channel 6 on the playback side of a videorecorder. It contains an adder circuit 15 and a subtracter circuit 25 on the output side of a two-line retarder circuit 14. The first signal inputs (+) of both these circuits and the signal input of the retarder circuit 14 are all connected to the signal input 16 of the comb filter 13.1 as a whole. The signal outputs 26 and 27 of, respectively, the adder and the subtracter circuit are connected, again respectively, to the envelope demodulators 28 and 29. The two demodulators transmit the enveloping curve signals |Sd| and |Sc| of, respectively, the subtracter and the adder circuit to the inputs (+) and (−) of a comparator circuit 30. The output signal Sf of the comparator circuit controls an electronic switch 31 in such a manner that it will transmit to the signal output 17 of the comb filter 13.1 either the unretarded signal Sa received at the input 16 of the comb filter or, alternately, the output signal Sc of the adder circuit 15, which is connected in parallel with the retarder circuit.

Figure 2:
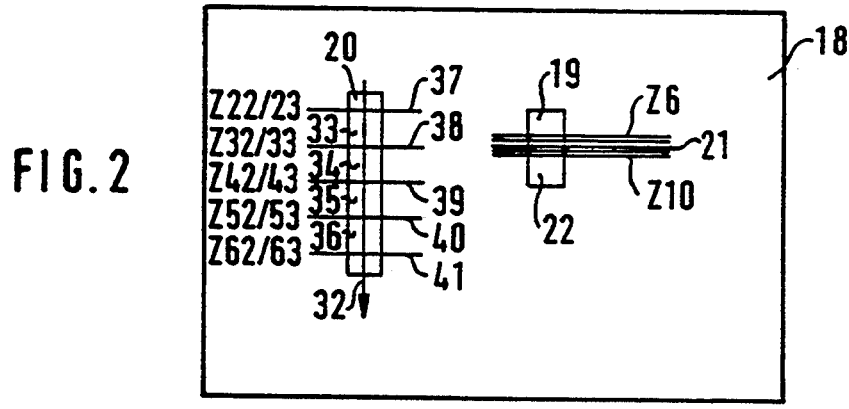
FIG. 2 shows a schematic representation of a color video picture on the playback side with two picture excerpts comprising line-parallel color edges.
Figure 3:
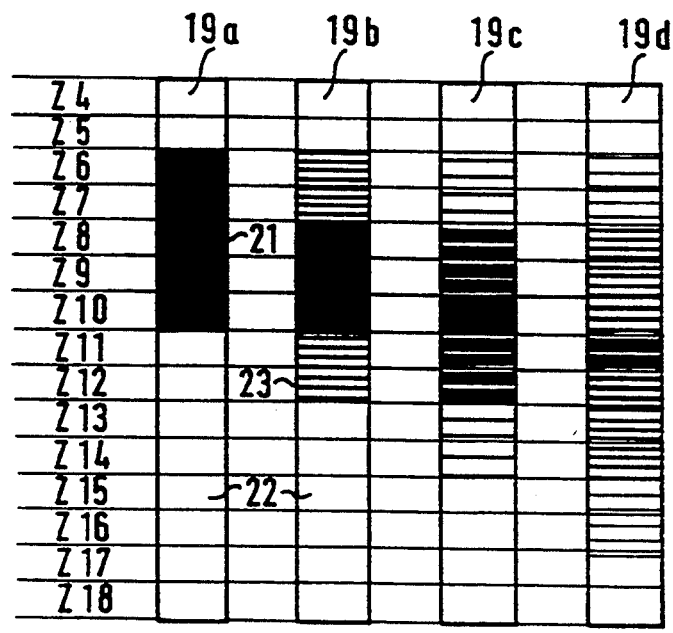
FIG. 3 shows a line-by-line representation of the reproduction (a) of the first picture excerpt of a color video signal to be recorded shown in the color video picture of FIG. 2, the reproduction (b) of this television signal recorded on a video tape, the reproduction (c) of a copy of this reproduction, and the reproduction (d) of a copy of the first copy.
Figure 6:
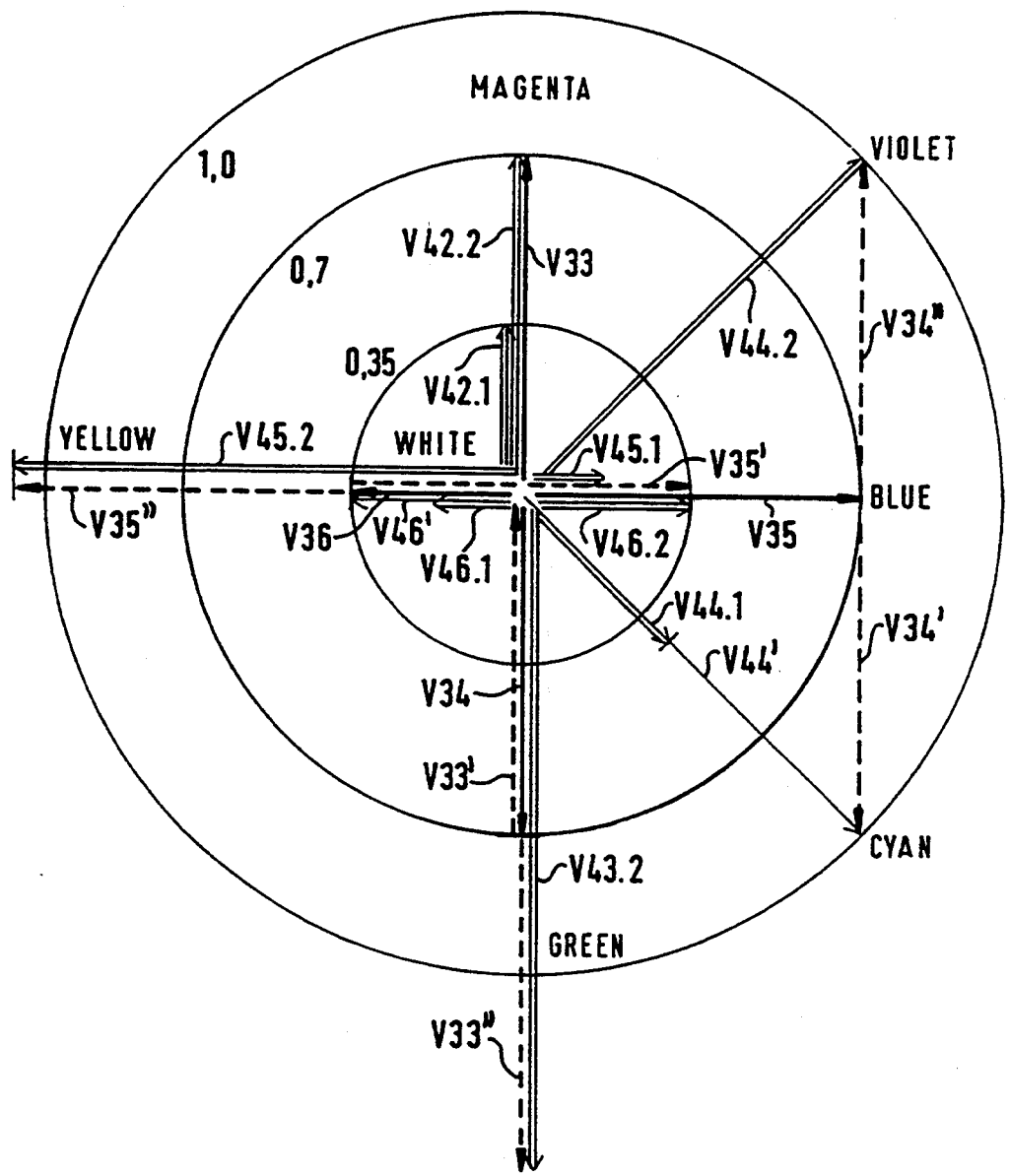
FIG. 6 shows a chromatic circle relating to the signals Sa to Sg of FIGS. 4 and 5.

The mode of action of the comb filter 13.1 shown in FIG. 4 will now be discussed in greater detail by reference to diagrams a) to g) of FIG. 5 and the chromatic circle reproduced in FIG. 6. Diagram a) of FIG. 5 provides a schematic representation of the chrominance signals Sa along the vertical line 32 of the picture excerpt 20 shown in FIG. 2 and extending over the adjacent lines of a video field that are here designated by the reference numbers Z21 to Z66. These line designations Z21 to Z66 need not necessarily agree with the customary line numberings of a television standard. The said picture excerpt contains several color strips 33 to 36 running parallel to the video lines and having different tonalities and different color saturations (intensities), so that there are the color transitions 37 between lines Z22 and Z23, 38 between lines Z32 and Z33, 39 between lines Z42 and Z43, 40 between line Z52 and 53, and 41 between lines Z62 and Z63. These line-parallel color edges 37 to 41 have also been drawn in diagram a) of FIG. 5, which represents the chrominance signal on the input side of the comb filter 13.1. In this diagram, moreover, the length of each block 33.1 to 36.1 corresponds to the level of the chrominance signal of the individual color strips 33 to 36 along the vertical line 32 of the picture excerpt 20 of the video picture 18 shown in FIG. 2. Each of these blocks 33.1 to 36.1 butts against one of the blocks 33.2 to 36.2. These blocks 33.2 to 36.2 correspond to the level of the crosstalk signal superposed on the useful (or desired) signal component of the chrominance signal. Diagram b) of FIG. 5 shows the chrominance signal Sb that has been delayed through two video lines by means of the retarder circuit, the representation mode being similar to that of diagram a). The phase position of the video lines of adjacent oblique tracks scanned from the video tape 1 is of such kind that the phase position of the crosstalk signals in the chrominance signals Sa applied to the input of the retarder circuit 14 and in the chrominance signals Sb available at the same time at the output of the retarder circuit are in phase opposition, while the useful signals are in equiphase. Consequently, when the two chrominance signals are added in the adder circuit 15, the useful signals will be added and the crosstalk signals will be substantially eliminated, as can readily be seen from the representation in diagram c) of FIG. 5, while subtraction in the subtracter circuit will essentially lead only to the transmission of the addition 47 of the crosstalk signals 33.2. In the embodiment here considered, the adder circuit 15 is so dimensioned that its output signal Sc will at all times represent the arithmetic mean of the sum of the input signals Sa and Sb. In the example here illustrated, moreover, the chrominances of the various color strips 33 to 36 are so chosen that the tonality of the second color strip 34 is complementary to the tonality of the first color strip 33, say green for the former and magenta for the latter, and that the tonality of the third color strip 35, blue for example, will have an angular position in the chromatic circle (FIG. 6) that lies more or less midway between the tonalities of the first and the second color strip 33, 34. The intensities of these tonalities amount to about 0.7 in the chromatic circle. The fourth color strip 36 contains a tonality (yellow) that is complementary to the tonality of the third color strip 35 and has half the intensity of the tonalities of the other three color strips 33 to 35. The color vectors V33 to V36 of these color strips 33 to 36 are shown as heavy lines in the chromatic circle of FIG. 6. In the two-line color overlap areas, which in diagram b) of FIG. 5 are identified by the reference numbers 42 to 46 and within which the input-side chrominance signals Sa of one color strip are overlapped by the retarded input-side chrominance signals Sb of the adjacent color strip, the aforesaid overlap leads to the formation of two-line disturbance strips of an off-color between any two adjacent color strips. The formation of these strips of a disturbance color in the overlap areas 42 to 46 will now be discussed in greater detail by reference to the chromatic circle shown in FIG. 6. In the first color overlap area 42 at the vertical color transition from the white background area to the first color strip 33 (strip color: red) the color vector V33 is transmitted by the adder circuit 15 with half its color intensity (color vector V42.1), while the subtracter circuit 25 transmits the same color vector V33 with its full color intensity as the color vector V42.2, all as shown in diagrams c) and b) of FIG. 5. In the second color overlap area 43 the color intensity of the mixed color produced by the two superposed tonalities is reduced to zero, because the two tonalities are complementary colors of the same intensity and the addition of their associated color vectors V33 and V34 yields zero as the result. The subtraction of these color vectors, which in the chromatic circle is represented by placing the vectors V34 and V33'' end to end, yields a color vector V43.2 running in the direction of the vector V34 but having twice its length. In the third color overlap area 44 the color vectors V34 and V35 of the overlapping color strips 33 and 34 form roughly a right angle between them, so that the addition of these two color vectors yields a color vector V44 in the cyan area. while the subtraction of the two vectors produces a color vector V44.2 in the violet zone. However, since the addition signal Sc is transmitted only with half the intensity of the color vector V44', it will be represented in the chromatic circle by the shorter colour vector V44.1. In the fourth color overlap area 45 we once again have the overlap of two complementary tonalities, though the two colors have different intensities, so that the addition of these two chrominance signals nevertheless yields an addition signal that will have the tonality of the chrominance signal of the more intense tonality, though this intensity will, of course, be appropriately reduced. The vector combinations (addition and subtraction) for this case are represented in the chromatic circle by the addition of the color vector V36 and the color vector V35', which yields the color vector V45.1, and the addition of the color vector V36 and the color vector V35'', which yields the color vector V45.2. In the color overlap area 46, again, the adder circuit 15 and the subtracter circuit 25 produce the color vectors V46.1 and V46.2. The width of the level blocks of the signals Sc and Sd shown in the color overlap areas 42 to 46 of diagrams c) and b) of FIG. 5 corresponds to the length of the appropriate resultant color vectors V42.1 to V46.2 of the chromatic circle shown in FIG. 6.

Diagram e) of FIG. 5 illustrates the resulting difference signal Se of the comparator, which is formed from the enveloping curve signals that are produced by the envelope demodulators 28 and 29 and then applied to the inputs (+) and (−) of the comparator circuit 30. The contour 48 on the right-hand side of this signal is the pattern of the enveloping curve of the subtraction (difference) signal Sd illustrated in diagram d). The horizontally shaded parts of the signals illustrated in diagram e) are the corresponding parts of the enveloping curve of the addition signal—which is illustrated in diagram c)—and have to be deducted from the contour of the enveloping curve of the subtraction signal Sd. This brings into being the contour 50 on the left-hand side of the resultant difference signal Se of the comparator represented in diagram e), the said contour being related to a comparison (or reference) level represented by the line 51. When the contour 50 on the left-hand side of the resultant comparator difference signal Se represented in diagram e) lies on the positive side, namely to the right of line 51 of the reference level, the comparator circuit 30 will produce a switching signal Sf at its signal output 56; this signal is shown in diagram f) of FIG. 5 and controls the electronic switcher 31. When the left-hand contour of the comparator difference signal Se represented in diagram e) does not overstep this reference level 51 in the direction of the positive side, the comparator circuit will not produce a switching signal.

As regards the embodiment here considered, the difference signal Se of the comparator circuit 30 is the level difference between the two enveloping curve signals applied to the comparator inputs (+) and (−). When these two signals are of the same level, the value of the comparator difference signal will become equal to zero. The illustrated comb filter 13.1 is so designed that the enveloping curve signal formed from the subtraction signal Sd in the color overlap areas (42 or 46) of a line-parallel color transition from a white part of the picture to a part of the picture having a tonality of a certain color intensity will always be of a higher level than the enveloping curve signal formed in these color overlap areas from the addition signal Sc.

When it is in its non-switched state (rest position), the electronic switcher 31 transmits the addition signal Sc formed in the adder circuit 15 to the signal output 17 of the comb filter, while in its switched state it will transfer the chrominance signal Sa applied to the comb filter input 16 directly to the filter output 17. By virtue of the fact that there is a great likelihood that the comparator circuit 30 will detect the overlap areas in which it is very probable that color disturbances capable of being perceived by the viewer will occur and, consequently, will characterize these areas by a switching signal Se, the disturbance-prone signals in this area can be replaced by a chromatically undisturbed signal 52 to 55, as schematically illustrated in diagram g) of FIG. 5. The chrominance signal Sg on the output side of the comb filter, which in the subsequent course of the transmission becomes the chrominance signal F and is combined with the brightness signal BAS to form the video signal FBAS, therefore consists of the addition signal Sc that has been freed of its crosstalk component and—in the color overlap areas 42 to 45—of the signal components 52 to 55 that have been taken from the chrominance signals 33 to 36 on the input side and have not therefore been subjected to any color changes due to the comb filter. This means that the comb filter 13.1 shown in FIG. 4 produces at its signal output 17 a chrominance signal that, as regards both tonality and color intensity, is identical with the unretarded chrominance signal on the input side of the filter, but does not contain any crosstalk disturbances associated with extensive color areas. The crosstalk disturbances 57 in the chrominance signal Sg on the output side of the filter associated with the line-parallel color transitions will not be perceived by the viewer's eye and, consequently, will not produce any disturbing effects in these parts of the color video picture.

With a view to ensuring that the two signals between which the electronic switcher 31 changes position will be of the same level, the adder circuit 15 is so designed that its output signal will correspond to the arithmetic mean of the input signals applied to it. This has the further advantage of representing a setting that optimizes the comparison conditions for the comparator circuit 30 and making possible the use of identical envelope demodulators 28 and 29. Given this design, signal switching is assured right down to minimal levels of the chrominance signal on the input side of the filter.

Figure 7:
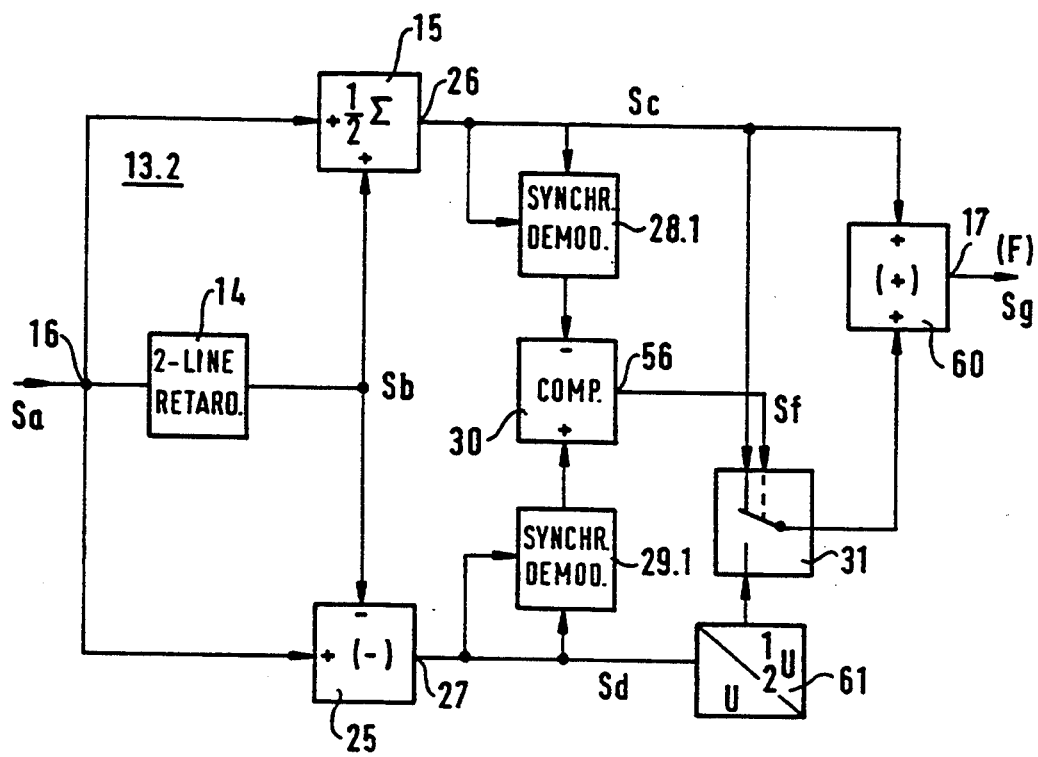
FIG. 7 shows a block diagram of a further embodiment of a comb filter, according to the present invention, and with a comparator circuit for comparing the addition signal with the subtraction signal and an adder circuit on the downstream side.

The comb filter 13.2 illustrated by FIG. 7 essentially differs from the comb filter 13.1 shown in FIG. 4 by the inclusion of a second adder circuit 60. Depending on the position of an electronic switcher 31, this second adder circuit can be used to transmit to the signal output 17 of the comb filter 13.2 either the addition signal Sc of a first adder circuit 15 of the comb filter or the addition signal made up of the addition signal Sc of the first adder circuit and the subtraction signal Sd of the subtracter circuit 25. By adding the output signal Sc of the first adder circuit 15 and the output signal Sd of the subtracter circuit 25, the two signals being always of corresponding levels, the second adder circuit produces an output signal Sg that does not differ from the unretarded chrominance signal on the input side of the filter. For the purposes of setting the right level of the subtraction signal, the transmission channel of the subtraction signal Sd in the embodiment here considered is provided with a damper circuit 61 that will have the level of the subtraction signal Sd. In the embodiment illustrated by FIG. 7, moreover, synchronous demodulators are used as the envelope demodulators 28 and 29, because the rapid action mode of these demodulators makes them particularly advantageous for this purpose.

With a view to avoiding click or cracking disturbances due to switching, it is also advantageous to design the electronic switchers in such a manner that, following a soft transition curve, they will gradually switch into the other position.

Although the invention has been shown and described with respect to detailed embodiments thereof, it should be understood that other embodiments may be made without departing from the spirit and scope of the claimed invention.

I claim:

1. A comb filter circuit for use in a chrominance signal transmission channel on a playback side of a video player for counteracting crosstalk occurring during scanning of the chrominance signal from a video tape, comprising:

a comb filter (14, 15), responsive to an input chrominance signal (Sa) having crosstalk thereon and chrominance signal edges therein, wherein the signal edges may be changing between a first and a second video line, for providing a corrected chrominance signal (Sc) free of crosstalk and a retarded input chrominance signal (Sb), which is retarded through at least one video line;

detection means (25) for detecting the chrominance signal edges, responsive to the input chrominance signal (Sa) and the retarded chrominance signal (Sb), for providing a difference chrominance signal (Sd), which includes chrominance in periods of difference in chrominance between the input chrominance signal (Sa) and the retarded chrominance signal (Sb), wherein the chrominance in the difference chrominance signal (Sd) in these periods has a magnitude greater than the chrominance in the corrected chrominance signal (Sc);

steering means, responsive to the corrected signal (Sc) and the difference chrominance signal (Sd), for providing a steering signal (Sf); and switching means (31), responsive to the input chrominance signal (Sa), the corrected chrominance signal (Sc) and the steering signal (Sf), for providing an output signal (Sg) which is the input chrominance signal (Sa) during the periods of difference in chrominance and otherwise it is the corrected chrominance signal (Sc).

2. The comb filter circuit of claim 1 wherein said comb filter comprises:

a retardation means (14) that provides said retarded input chrominance signal (Sb), as well as an adder and a subtracter circuit (15, 25) for forming said corrected chrominance signal (Sc) as an addition signal and said difference chrominance signal as a subtraction signal (Sd) from unretarded and retarded input chrominance signals (Sa, Sb), and wherein said steering means comprises a detection circuit for detecting the chrominance signal edges by recognizing a signal combination that is suitable for indicating a color disturbance at a line-parallel color transition (37, ...) of a transmitted and reproduced video picture (18) and switching off an action of the comb filter causing the color disturbance, wherein the detection circuit includes two envelope demodulators (28, 29) that provide an enveloping curve signal from the addition signal (Sc) and an enveloping curve signal from the subtraction signal (Sd) and wherein the detection circuit also includes a comparator circuit (30) for comparing the enveloping curve signals from the addition signal (Sc) and the subtraction signal (Sd) for providing said steering signal (Sf) whenever an amplitude of the enveloping curve signal (vector V42.2) from the subtraction signal is greater than an amplitude of the enveloping curve signal (vector V42.1) from the addition signal, and the comb filter circuit (13) is so designed that the amplitude of the enveloping curve signal (vector V42.2) from the subtraction signal at a vertical color transition (21) from a white or colorless background (22) to a tonality (vector V33) of a given color saturation of a chromatic circle is greater than the amplitude of the enveloping curve signal (vector V42.1) from the addition signal.

3. A comb filter circuit in accordance with claim 2, wherein the amplitude of the enveloping curve signal (vector V42.2) from the subtraction signal (Sd) at a vertical color transition (21) from the white or colorless background (22) to a tonality (vector V33) of a given color saturation of the chromatic circle, is set in the comb filter to be twice as great as the amplitude of the enveloping curve signal (vector V42.1) from the addition signal (Sc).

4. A comb filter circuit in accordance with claim 2, wherein the adder circuit (15) is a circuit for forming an arithmetic mean of the unretarded and retarded input chrominance signals (Sa and Sb).

5. A comb filter circuit in accordance with claim 2, wherein the envelope demodulators are synchronous demodulators for demodulating the enveloping curve signals from the addition signal (Sc) and the subtraction signal (Sd).

6. The comb filter circuit of claim 1 wherein said comb filter (14, 15) comprises:
a retarder (14), responsive to the input chrominance signal (Sa), for providing the retarded input chrominance signal (Sb);
an adder (15), responsive to the input chrominance signal (Sa) and to the retarded input chrominance signal, for providing the corrected chrominance signal (Sc); and wherein said detection means is a subtractor (25), responsive to the input chrominance signal (Sa) and to the retarded signal (Sb), for providing the difference chrominance signal (Sd); wherein said steering means comprises:
a first envelope detector (28), responsive to the corrected chrominance signal (Sc), for providing a first envelope signal;
a second envelope detector (29), responsive to the difference chrominance signal (Sd), for providing a second envelope signal;
a comparator, responsive to the first and second envelope signals, for providing the steering signal (Sf); and wherein said
switch (31) is for providing as said output signal (Sg) the input signal (Sa) for a difference chrominance signal absolute magnitude greater than an absolute magnitude of the corrected chrominance signal and, for otherwise providing as the output signal (Sg) the corrected chrominance signal (Sc).

7. The comb filter circuit of claim 6, wherein the corrected chrominance signal (Sc) has a magnitude less than a summation of absolute value magnitudes of the input chrominance signal and retarded input chrominance signal.

8. The comb filter of claim 6, wherein the adder (15) provides the corrected chrominance signal (Sc) having a magnitude indicative of an arithmetic mean of a magnitude of the input chrominance signal and a magnitude of the retarded input chrominance signal.

9. The comb filter of claim 6, wherein the adder (15) provides the corrected chrominance signal (Sc) having a magnitude at a fraction of a summed magnitude of the input chrominance signal and the retarded input chrominance signal.

10. The comb filter of claim 11, wherein said comb filter (14, 15) comprises:
a retarder (14), responsive to the input chrominance signal (Sa), for providing a retarded input chrominance signal (Sb);
a first adder (15), responsive to the input chrominance signal (Sa) and the retarded input chrominance signal (Sb), for providing the corrected chrominance signal (Sc) at a selected fraction of a summed magnitude of the input chrominance signal and the retarded input chrominance signal; and
a subtractor (25), responsive to the input chrominance signal (Sb) and the retarded input chrominance signal (Sb), for providing a difference chrominance signal (Sd); wherein said steering means comprises:
a first synchronous demodulator (28.1), responsive to the corrected chrominance signal (Sc), for providing a first demodulated signal;
a second synchronous demodulator (29.1), responsive to the difference chrominance signal (Sd), for providing a second demodulated signal;
a comparator (30), responsive to the first and second demodulated signals, for providing the steering signal (Sf);
a voltage divider (61), responsive to the difference chrominance signal (Sd), for providing a difference signal reduced in magnitude at the selected fraction; and wherein the switching means (31) comprises:
a switch, responsive to the corrected chrominance signal (Sc), the reduced in magnitude difference chrominance signal and the steering signal, for providing a switch output signal; and
a second adder (60), responsive to the corrected chrominance signal (Sc) and the switch output signal, for providing the output signal (Sg).

* * * * *

UNITED STATES PATENT AND TRADEMARK OFFICE
CERTIFICATE OF CORRECTION

PATENT NO. : 5,381,239
DATED : January 10, 1995
INVENTOR(S) : G. Reime

It is certified that error appears in the above-indentified patent and that said Letters Patent is hereby corrected as shown below:

On the title page, item [56], line 5, change "Sukura" to --Sakura--

Column 12, line 13, change "claim 11" to --claim 1--.

Signed and Sealed this

Twenty-first Day of March, 1995

Attest:

BRUCE LEHMAN

*Attesting Officer*  *Commissioner of Patents and Trademarks*